(12) United States Patent
Ishida et al.

(10) Patent No.: US 10,138,861 B2
(45) Date of Patent: Nov. 27, 2018

(54) IGNITION DEVICE

(71) Applicants: SOKEN, INC., Nishio, Aichi-pref. (JP); DENSO CORPORATION, Kariya, Aichi-pref. (JP)

(72) Inventors: Shohei Ishida, Nishio (JP); Shunichi Takeda, Kariya (JP)

(73) Assignees: SOKEN, INC., Nishio (JP); DENSO CORPORATION, Kariya (JP)

( * ) Notice: Subject to any disclaimer, the term of this patent is extended or adjusted under 35 U.S.C. 154(b) by 0 days.

(21) Appl. No.: 15/753,227

(22) PCT Filed: Jul. 26, 2016

(86) PCT No.: PCT/JP2016/071822
§ 371 (c)(1),
(2) Date: Feb. 16, 2018

(87) PCT Pub. No.: WO2017/029951
PCT Pub. Date: Feb. 23, 2017

(65) Prior Publication Data
US 2018/0245562 A1 Aug. 30, 2018

(30) Foreign Application Priority Data
Aug. 19, 2015 (JP) ................................ 2015-162346

(51) Int. Cl.
*F02P 9/00* (2006.01)
*F02P 5/15* (2006.01)
*F02P 15/10* (2006.01)

(52) U.S. Cl.
CPC ................ *F02P 5/15* (2013.01); *F02P 9/002* (2013.01); *F02P 15/10* (2013.01)

(58) Field of Classification Search
CPC ...... F02P 5/14; F02P 5/15; F02P 9/002; F02P 15/10
(Continued)

(56) References Cited

U.S. PATENT DOCUMENTS 7,347,195 B2 * 3/2008 Biljenga ............... F02P 3/0453
123/620
2005/0279337 A1 * 12/2005 Biljenga ............... F02P 3/0453
123/620
(Continued)

FOREIGN PATENT DOCUMENTS

JP 58155277 A * 9/1983 ............... F02P 5/14
JP 06-272590 9/1994

*Primary Examiner* — Erick Solis
(74) *Attorney, Agent, or Firm* — Nixon & Vanderhye P.C.

(57) ABSTRACT

In an ignition device, a second circuit energizes a primary coil from its negative side in a first direction to thereby maintain energization of a second coil in a second direction during spark discharge started by a first circuit. The maintained energization continuously supplies energy to a spark plug, thus performing a continuation of the spark discharge. The first direction is opposite to a direction of energization of the primary coil carried out by the first circuit, and the second direction is the same as a direction of energization of the second coil that has been started based on the first circuit. A humidity detection unit detects humidity of intake air into an engine. The control section controls the first circuit to advance start timing of the spark discharge generated by the first circuit in accordance with an increase in the humidity of the intake air.

5 Claims, 5 Drawing Sheets (58) Field of Classification Search
USPC .................................................. 123/620, 625
See application file for complete search history.

(56) References Cited

U.S. PATENT DOCUMENTS

2010/0206267 A1* 8/2010 Glugla .................. F02D 35/021
                                                             123/406.26
2017/0058854 A1* 3/2017 Nakamura ............ F02P 5/1512

* cited by examiner

IGNITION DEVICE

This application is the U.S. national phase of International Application No. PCT/JP2016/071822 filed Jul. 26, 2016 which designated the U.S. and claims priority to JP Patent Application No. 2015-162346 filed Aug. 19, 2015, the entire contents of each of which are hereby incorporated by reference.

TECHNICAL FIELD

The present invention relates to an ignition device for an internal combustion engine.

BACKGROUND ART

Recently, accurate control of an internal combustion engine conforming to the surrounding environment such as temperatures is sought to enhance fuel economy, reduce emissions, and the like. For example, under high humidity environment, an air-fuel mixture is unlikely to be ignited owing to an increase in the heat capacity of the air-fuel mixture, and, even when the air-fuel mixture fires, the flame is unlikely to spread.

Consequently, the combustion characteristics of the air-fuel mixture may become deteriorated. It is therefore desired to provide a countermeasure thereto.

Patent Literature 1 describes an ignition device that increases the air-fuel ratio to thereby decrease NOx under a high humidity environment. However, this ignition device increases the air-fuel ratio in a state in which the air-fuel mixture is difficult to fire due to the high humidity environment and the flame is unlikely to spread. This may result in blow-off of the flame.

CITATION LIST

Patent Literature

[PTL 1] JP H06-272590 A

SUMMARY

Technical Problem

The present invention has been made, in view of the aforementioned issues. An object of the present invention is to provide ignition devices, each of which is capable of reducing deterioration of the combustion characteristics under a high humidity environment.

Solution to Problem

An ignition device for an internal combustion engine according to an aspect of the present invention includes an ignition coil having a primary coil and a secondary coil, and a spark plug connected to the secondary coil. Energization and de-energization of the primary coil generate electromagnetic induction. The electromagnetic induction supplies energy to the spark plug to thereby generate spark discharge. The ignition device includes a first circuit, a second circuit, a control section, and a humidity detection unit.

The first circuit is operative to energize and de-energize the primary coil to cause the spark plug to start the spark discharge. The second circuit is operative to energize the primary coil from a negative side of the primary coil in a first direction to thereby maintain energization of the second coil in a second direction during the spark discharge started by the operation of the first circuit. The maintained energization continuously supplies energy to the spark plug, thus performing a continuation of the spark discharge. The first direction is opposite to a direction of energization of the primary coil carried out by the first circuit, and the second direction is the same as a direction of energization of the second coil, the energization of the second coil having been started based on the operation of the first circuit.

The control section controls the operation of the first circuit and an operation of the second circuit. The humidity detection unit detects humidity of intake air taken into the internal combustion engine. The control section is configured to control the first circuit to advance start timing of the spark discharge generated by the first circuit, in accordance with an increase in the humidity of the intake air.

Advancing the start timing of the spark discharge generated by the first circuit enables the firing of the air-fuel mixture to occur smoothly. This compensates for difficulty in firing of the air-fuel mixture and difficulty in spread of the flame due to high humidity. This results in reduction in deterioration of the combustion characteristics under a high humidity environment.

DESCRIPTION OF EMBODIMENT

The following describes an embodiment of the present invention. It is to be understood that the embodiment merely discloses a specific example and therefore the present invention is not limited to the embodiment.

Embodiment

Configuration of Embodiment

Figure 1:
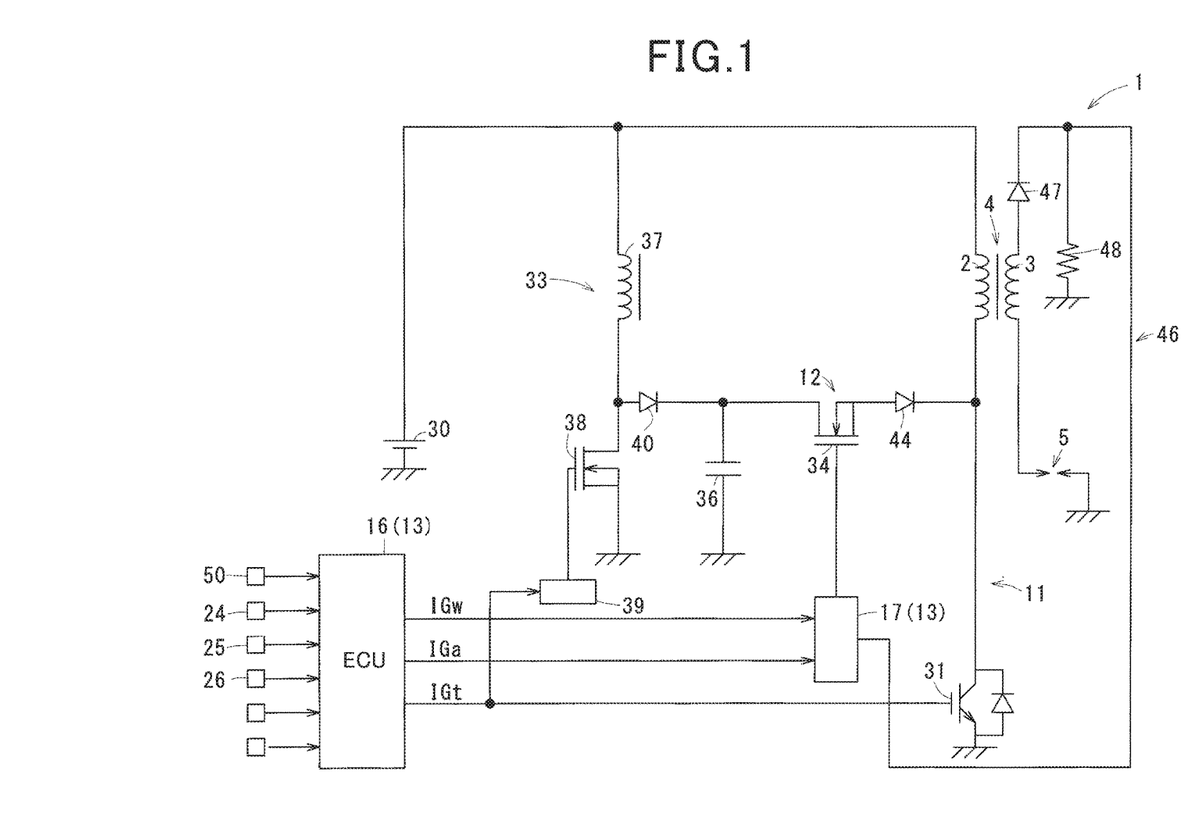
FIG. 1 is a configuration diagram of an ignition device according to an embodiment of the present invention.
Figure 2:
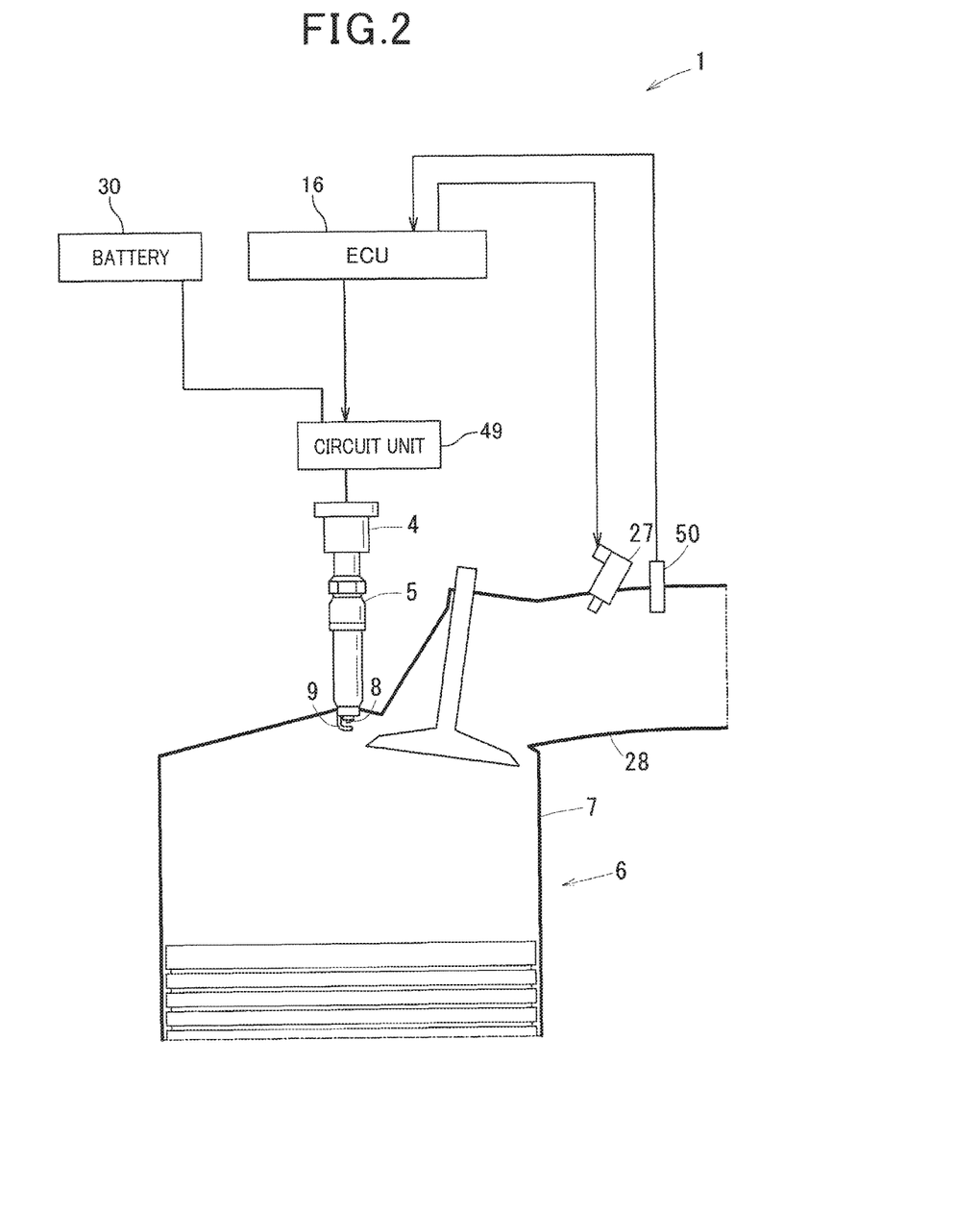
FIG. 2 is a configuration diagram of an internal combustion engine including the ignition device.

Referring to FIGS. 1 and 2, the following describes an ignition device 1 according to the present embodiment.

The ignition device 1 includes an ignition coil 4 comprised of a primary coil 2 and a secondary coil 3, and a spark plug 5 connected to the secondary coil 3. The ignition device 1 is configured to perform energization and de-energization of the primary coil 2 to thereby cause electromagnetic induction. The electromagnetic induction supplies energy to the spark plug 5, to thereby cause the spark plug 5 to generate spark discharge for an air-fuel mixture. The ignition device 1 is mounted on an internal combustion engine 6 for driving a vehicle, and ignites the air-fuel mixture in a combustion chamber 7 at a predetermined ignition timing.

The spark plug 5 has a known configuration, and includes a center electrode 8 connected to a first end of the secondary coil 3 and a ground electrode 9 grounded via the cylinder head or the like of the internal combustion engine 6. The spark plug 5 generates spark discharge between the center electrode 8 and the ground electrode 9 based on energy generated in the secondary coil 3.

The internal combustion engine 6 is capable of performing lean-burning using gasoline as a fuel, and is configured such that rotational flow of the air-fuel mixture, such as tumble flow or swirl flow, is generated in the combustion chamber 7. The ignition device 1 will be described below in detail.

The ignition device 1 includes a first circuit 11, a second circuit 12, and a control section 13. The first circuit 11 causes the spark plug 5 to start spark discharge by turning on/off energization to the primary coil 2. During spark discharge started by the operation of the first circuit 11, the second circuit 12 energizes the primary coil 2 in a direction opposite to the direction of the energization carried out by the first circuit 11. This enables the second circuit 12 to maintain an energization direction of the secondary coil 3 to be the same as the direction of energization started by the first circuit 11. This results in continuation of energy supply to the spark plug 5 to thereby continue spark discharge. The control section 13 controls the operation of the first and second circuits 11, 12, and includes an electronic control unit (hereinafter referred to as ECU) 16, an energization driver 17, and the like.

The ECU 16 serves as a center of control for the internal combustion engine 6, and outputs various signals, such as an ignition signal IGt and a discharge continuation signal IGw, described later, to control energization of the primary coil 2. Control of energization of the primary coil 2 enables the electric energy induced in the secondary coil 3 to be controlled, making it possible to control spark discharge by the spark plug 5.

The ECU 16 receives signals from various sensors mounted on the vehicle to detect parameters indicating the operating conditions and the controlled state of the internal combustion engine 6. The ECU 16 includes an input circuit for processing input signals, a CPU for performing control processing and calculation processing related to the control of the internal combustion engine 6, based on the input signals. Furthermore, the ECU 16 includes various memories for storing data, programs, and the like, needed for controlling the internal combustion engine 6, and an output circuit for outputting signals needed for the control of the internal combustion engine 6, based on the processing results of the CPU.

The various sensors outputting signals to the ECU 16 include, for example, a rotation speed sensor 24 for detecting the rotation speed of the internal combustion engine 6, an intake pressure sensor 25 for detecting the pressure of the intake air taken into the internal combustion engine 6, and an air-fuel ratio sensor 26 for detecting the air-fuel ratio of the air-fuel mixture. The ECU 16 executes ignition control through the use of the ignition device 1, fuel injection control through the use of a fuel injection valve 27, and the like, based on the detected values of parameters obtained from these sensors. The ignition device 1 of the present example is provided with the fuel injection valve 27 disposed in an intake-air passage 28. However, the configuration may be a so-called direct injection type that injects fuel directly into the combustion chamber 7.

The first circuit 11 includes a first switch 31 for starting discharge disposed at the ground side (lower electric potential side) of a first terminal of the primary coil 2. The first switch 31 connects the positive electrode of a battery 30 to a second terminal of the primary coil 2, and connects the first terminal of the primary coil 2 to the ground.

Turn-on and turn-off of the first switch 31 in the first circuit 11 allows the primary coil 2 to store energy, and the energy stored in the primary coil 2 generates a high voltage in the secondary coil 3 to thereby cause the spark plug 5 to start spark discharge. Hereinafter, the spark discharge generated by the operations of the first circuit 11 may be referred to as main ignition. With regard to the energization direction of the primary coil 2 (that is, the direction of a primary current), the direction from the battery 30 toward the first switch 31 is taken to be positive.

More specifically, the first circuit 11 turns on the first switch 31 based on for the period during which the ignition signal IGt is supplied from the ECU 16 to the first switch 31, thus applying the voltage across the battery 30 to the primary coil 2 and supplying the primary current having a positive polarity thereto. This enables magnetic energy to be stored in the primary coil 2. Thereafter, the first circuit 11 turns off the first switch 31 to cause the secondary coil 3 to generate a high voltage based on electromagnetic induction. This causes the main ignition to occur. The first switch 31 is an IGBT, a MOS transistor, a thyristor, or the like. The ignition signal IGt instructs, to the primary coil 11, the period during which the primary coil 2 stores energy in the first circuit 11 and also the ignition start timing.

The second circuit 12 is provided between the primary coil 2 and the first switch 31, and includes a second switch 34 which turns on/off power supply from a boost circuit 33 to the primary coil 2. The boost circuit 33 boosts the voltage across the battery 30 to store the voltage in a capacitor 36 for the period during which the ignition signal IGt is supplied from the ECU 16 to the boost circuit 33.

More specifically, the boost circuit 33 includes the capacitor 36, a choke coil 37, a boost switch 38, a boost driver 39, and a diode 40. The choke coil 37 has an end connected to the positive electrode of the battery 30. The boost switch 38 enables the choke coil 37 to be intermittently energized. The boost driver 39 supplies a control signal to the boost switch 38 to thereby turn on/off the boost switch 38. The boost switch 38 may be, for example, a MOS transistor or the like. Turning on/off of the boot switch 38 enables magnetic energy stored in the choke coil 37 to be stored in the capacitor 36 as electrical energy.

The boost driver 39 is ensured to cyclically turn on/off the boost switch 38 during the period in which the ignition signal IGt is supplied from the ECU 16. The diode 40 prevents the energy stored in the capacitor 36 from flowing back toward the choke coil 37.

The second circuit 12 includes the second switch 34 and a diode 44. The second switch 34 is, for example, a MOS transistor which turns on/off supply of the energy from the capacitor 36 to the negative side of the primary coil 2. The diode 44 prevents backflow of current from the primary coil 2 toward the second switch 34. The energization driver 17 sends a control signal to the second switch 34 to thereby turn on the second switch 34. This enables energy to be supplied from the boost circuit 33 to the negative side of the primary coil 2.

During the period when a discharge continuation signal IGw is supplied to the energization driver 17, the energization driver 17 turns on/off the second switch 34 to control energy supplied from the capacitor 36 to the primary coil 2, to thereby control a secondary current indicative of the energization amount of the secondary coil 3. The discharge continuation signal IGw instructs the period for continuing spark discharge generated as the main ignition.

During spark discharge started by the operations of the first circuit 11, the second circuit 12 energizes the primary coil 2 in a direction opposite to the direction of energization carried out by the first circuit 11. This enables the second circuit 12 to maintain the energization direction of the secondary current to be the same as the direction of energization started by the first circuit 11. This results in continuation of energy supply to the spark plug 5 to thereby continue spark discharge. Hereinafter, such spark discharge, which continues to the main ignition, based on the operations of the second circuit 12 may be referred to as continuous spark discharge.

The energization driver 17 controls the secondary current based on a current instruction signal IGa provided from the ECU 16 and indicating a command value for the secondary current. The first end of the secondary coil 3 is connected to the center electrode 8 of the spark plug 5 as described above. A second end of the secondary coil 3, which is opposite to the first end, is connected to a feedback (F/B) circuit 46.

The F/B circuit 46 detects the secondary current generated in the secondary coil 3 and feeds the secondary current back to the control section 13. The second end of the secondary coil 3 is connected to the F/B circuit 46 via a diode 47 that restricts the secondary current to flow in one direction. A shunt resistor 48 is connected to the F/B circuit 46 for detecting the secondary current.

The energization driver 17 controls the on/off switching operations of the second switch 34 based on the detected value of the secondary current fed back thereto, and the command value for the secondary current detected based on the current instruction signal IGa. The energization driver 17, for example, determines upper and lower thresholds for the detected value of the secondary current based on the command value, and starts or stops outputting the control signal according to the result of comparing the detected value with the upper and lower thresholds. More specifically, when the detected value of the secondary current is larger than the upper limit, the energization driver 17 stops outputting the control signal. When the detected value of the secondary current is smaller than the lower limit, the energization driver 17 starts outputting the control signal.

The first and second circuits 11 and 12, the F/B circuit 46, and the energization driver 17 are assembled as a circuit unit 49. The spark plug 5, the ignition coil 4 and the circuit unit 49 are installed in each cylinder.

Figure 3:
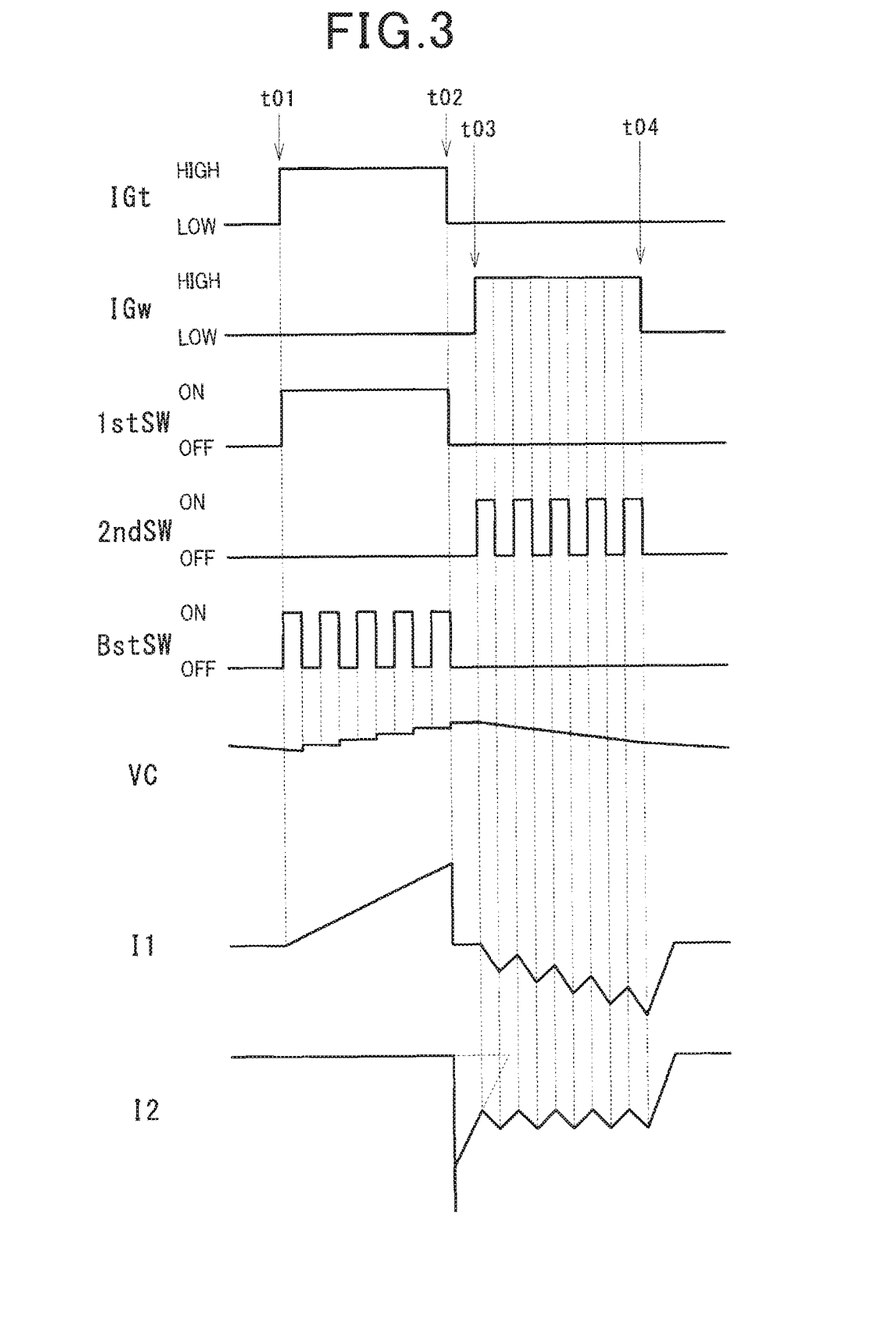
FIG. 3 is a timing chart illustrating operations of the ignition device.

The following describes the operations of the ignition device 1 with reference to FIG. 3. In FIG. 3, "IGt" represents the input state of the ignition signal IGt with high/low levels, and "IGw" represents the input state of the discharge continuation signal IGw with high/low. "1stSW" represents the on/off state of the first switch 31, "2ndSW" represents the on/off state of the second switch 34, "BstSW" represents the on/off state of the boost switch 38, and "VC" represents the charged voltage in the capacitor 36. "I1" represents the primary current (the current supplied to the primary coil 2), and "I2" represents the secondary current (the current supplied to the secondary coil 3).

When the ignition signal IGt switches from the low level to the high level (see time t01) and while the ignition signal IGt is high, the first switch 31 is maintained in the on state, so that the primary current having the positive polarity flows to the primary coil 2. This enables energy to be stored in the primary coil 2. While the charged voltage in the capacitor 36 is lower than a predetermined value, the boost switch 38 is repeatedly turned on/off, so that the boosted energy is stored in the capacitor 36.

When the ignition signal IGt switches from the high level to the low level (see time t02), the first switch 31 is turned off, so that the energization of the primary coil 2 is interrupted. This results in a high voltage being generated in the secondary coil 3 based on electromagnetic induction, thus causing the spark plug 5 to start the main ignition. After the occurrence of the main ignition by the spark plug 5, the secondary current attenuates in a substantially triangular waveform (see the dotted line of 12). Then, before the secondary current reaches the lower threshold, the discharge continuation signal IGw switches from the low level to the high level (see time t03).

When the discharge continuation signal IGw switches from the low level to the high level, controlling the on/off switching operations of the second switch 34 enables the energy stored in the capacitor 36 to be sequentially supplied to the negative side of the primary coil 2. Accordingly, the primary current flows from the primary coil 2 toward the positive electrode of the battery 30. Specifically, every time the second switch 34 is turned on, an additional primary current flowing from the primary coil 2 toward the positive electrode of the battery 30 is added to the primary current flowing through the primary coil 2, so that the primary current increases toward the negative side (see time t03 to time t04).

Every time the additional primary current is added to the primary current, an additional secondary current, which has the same direction as the direction of the secondary current based on the main ignition, is sequentially added to the secondary coil 3, so that the level of the secondary current is maintained between the upper and lower limits. Thus, controlling the on/off switching operations of the second switch 34 enables the secondary current to continuously flow to have a level that enables spark discharge to be maintained. The on state of the discharge continuation signal IGw being continuously maintained therefore enables the continuous spark discharge to be maintained in the spark plug 5.

Characteristics of the Embodiment

The following describes characteristic configurations of the embodiment.

The ignition device 1 according to the embodiment further includes a humidity detection section (hereinafter referred to as humidity sensor 50). The humidity sensor 50 is disposed in the intake-air passage 28 to guide intake air to the internal combustion engine 6, and detects humidity of the intake air, to thereby cause the ECU 16 to output a signal based on the humidity of the intake air (see FIG. 2).

The control section 13 uses first and second modes properly based on the detected value of humidity of the humidity sensor 50. The control section 13 uses the first and second bodes for controlling the start timing of the spark discharge conducted by the first circuit 11, and for controlling the amount of energy supplied to the spark plug 5 by the second circuit 12.

The first mode represents a normal state mode. In the first mode, the control section 13 sets the start timing of the spark discharge conducted by the first circuit 11 to a predetermined time, and sets the amount of energy supplied to the spark plug 5 by the second circuit 12 to a predetermined amount of energy (hereinafter, this first mode is referred to as a normal mode).

The second mode represents a high humidity state mode. In the second mode, the control section 13 sets the start timing of the spark discharge conducted by the first circuit 11 to be advanced compared to the start timing in the normal mode, and sets the amount of energy supplied to the spark plug 5 by the second circuit 12 to be increased compared to the amount of energy in the normal mode (hereinafter, this second mode is referred to as a high humidity mode).

Operations in the Embodiment

Figure 4:
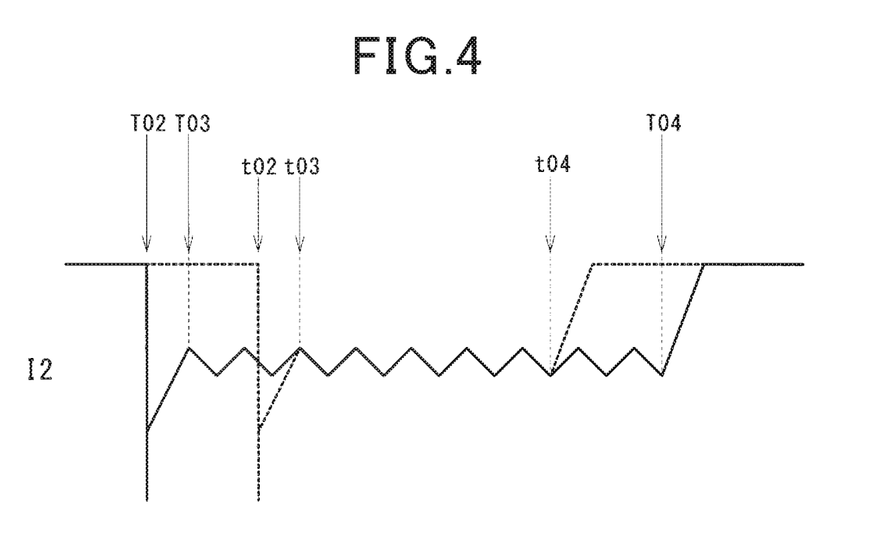
FIG. 4 is a diagram illustrating how a secondary current is changed over time in each of a normal mode and a high humidity mode of the ignition device.

The following describes the operations in the embodiment with reference to FIG. 4. The solid line in FIG. 4 represents how the secondary current is changed over time in the high humidity mode, and the dotted line represents how the secondary current is changed over time in the normal mode. It is assumed that the command value of the secondary current is determined equally for each of the high humidity mode and the normal mode. Each of reference characters represents time at which the corresponding signal is switched from one state to the other state in the high humidity mode, and each of reference characters t02, t03, and t04 represents time at which the corresponding signal is switched from one state to the other state.

More specifically, T02 represents time at which the ignition signal IGt is switched from the high level to the low level, and corresponds to t02 in FIG. 3. T03 represents time at which the discharge continuation signal IGw is switched from the low level to the high level, and corresponds to t03 in FIG. 3. T04 represents time at which the discharge continuation signal IGw is switched from the high level to the low level, and corresponds to t04 in FIG. 3.

Similarly, t02 represents time at which the ignition signal IGt is switched from the high level to the low level, and corresponds to t02 in FIG. 3. t03 represents time at which the discharge continuation signal IGw is switched from the low level to the high level, and corresponds to t03 in FIG. 3. t04 represents time at which the discharge continuation signal IGw is switched from the high level to the low level, and corresponds to t04 in FIG. 3.

Firstly, the control section 13 determines whether the intake air is in a high humidity state based on the detected value of the humidity sensor 50. Specifically, the control section 13 determines whether the intake air is in the high humidity state based on determination of whether the detected value of the humidity sensor 50 has exceeded a predetermined threshold.

Upon determining that the intake air is in the high humidity state, the control section 13 executes the high humidity mode. Execution of the high humidity mode causes the ignition device 1 to advance the start timing of spark discharge compared to the start timing in the normal mode (see time T02 as compared with time t02). Accordingly, the amount of energy supplied to the spark plug 5 increases in the high humidity mode compared to the amount of energy supplied to the spark plug 5 in the normal mode. Because the command value of the secondary current in the high humidity mode is equal to the command value of the secondary current in the normal mode, extending the discharge continuation period enables the amount of energy supplied to the spark plug 5 to increase (see period from time T03 to time T04 as compared with period from time t03 to time t04).

Note that the period from the time T02 to the time T03 and the period from the time t02 to the time t03 are substantially equal because the command value of the secondary current in the high humidity mode is equal to the command value of the secondary current in the normal mode.

Otherwise, upon determining that the intake air is not in the high humidity state, the control section 13 executes the normal mode.

Advantageous Effects of the Embodiment

The control section 13 of the ignition device 1 according to the embodiment controls the first circuit 11 to advance the start timing of spark discharge generated by the first circuit 11 in accordance with an increase in the humidity of the intake air. Additionally, the control section 13 controls the second circuit 12 to increase the amount of energy supplied to the spark plug 5 in accordance with an increase in the humidity of the intake air.

Advancing the start timing of spark discharge generated by the first circuit 11 enables the firing of the air-fuel mixture to occur smoothly, and increasing the amount of energy to the spark plug 5 supplied by the second circuit 12 enables the flame to spread easily. The advancing of the start timing of spark discharge and increasing of the amount of energy to the spark plug 5 compensate for difficulty in firing of the air-fuel mixture and for difficulty in spread of the flame due to high humidity. This results in reduction in deterioration of the combustion characteristics.

The control section 13 of the ignition device 1 according to the embodiment controls the operations of the second circuit 12 to thereby extend the discharge continuation period, thus increasing the amount of energy supplied to the spark plug 5. This results in the amount of energy supplied to the spark plug 5 to increase without increasing the intensity of the secondary current.

That is, the secondary circuit 12, which extends or reduces the period of increasing the primary current to its negative side, enables the period for the continuous spark discharge to increase or decrease without increasing the intensity of the secondary current.

In contrast, an ignition device including no second circuit may be configured to only increase the second current to thereby extend the discharge period, resulting in an inevitable increase in the wearing out of the spark plug.

The ignition device 1 according to the embodiment therefore makes it possible to reduce the wearing out of the spark plug 5 while increasing the amount of energy to the spark plug 5 as compared with the ignition device including no second circuit.

Modification

The present invention can be modified variously without departing the scope of the present invention.

Figure 5A:
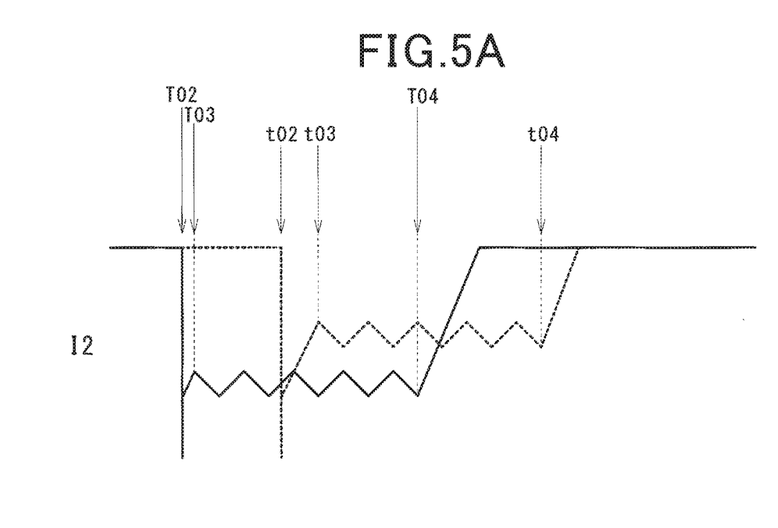
FIG. 5A is a diagram illustrating how a secondary current is changed over time in each of the normal mode and the high humidity mode of the ignition device.

The aforementioned embodiment is configured to extend the discharge continuation period to thereby extend the amount of energy to the spark plug 5 in the high humidity mode. However, as shown in FIG. 5A, it is possible to increase the magnitude of the secondary current to thereby increase the amount of energy supplied to the spark plug 5. In FIG. 5A, the period of the continuous spark discharge is the same between the high humidity mode and the normal mode (see the period from the time T03 to the time T04 and the period from the time t03 to the time t04).

This modification enables the period of the continuous spark discharge to be reduced for smooth preparation of the subsequent firing, i.e. subsequent ignition, of the air-fuel mixture. For example, increasing the magnitude of the command value of the secondary current enables the magnitude of the secondary current to increase.

Figure 5B:
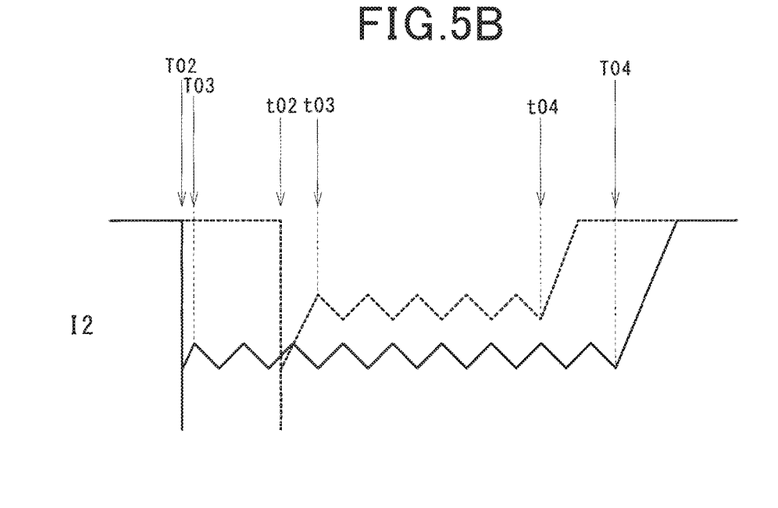
FIG. 5B is a diagram illustrating how a secondary current is changed over time in each of the normal mode and the high humidity mode of an ignition device according to a modification.

As illustrated in FIG. 5B, it is possible to increase the magnitude of the secondary current and increase the period of the continuous spark discharge to thereby increase the amount of energy supplied to the spark plug 5.

The aforementioned embodiment is configured to switch between the high humidity mode and the normal mode according to a threshold determination. It is possible to advance the start timing of spark discharge and increase the amount of energy supplied to the spark plug 5 in proportion to the detected value of the humidity measured by the humidity sensor 50.

REFERENCE SIGNS LIST

1 Ignition device
2 Primary coil
3 Secondary coil
4 Ignition coil
5 Spark plug
11 First circuit
12 Second circuit
13 Control section
50 Humidity sensor (Humidity detection section)

The invention claimed is:

1. An ignition device for an internal combustion engine, the ignition device comprising:
   an ignition coil having a primary coil and a secondary coil;
   a spark plug connected to the secondary coil, energization and de-energization of the primary coil generating electromagnetic induction, the electromagnetic induction supplying energy to the spark plug to thereby generate spark discharge;
   a first circuit operative to energize and de-energize the primary coil to cause the spark plug to start the spark discharge;
   a second circuit operative to energize the primary coil from a negative side of the primary coil in a first direction to thereby maintain energization of the second coil in a second direction during the spark discharge started by the operation of the first circuit, the maintained energization continuously supplying energy to the spark plug, thus performing a continuation of the spark discharge,
   the first direction being opposite to a direction of energization of the primary coil carried out by the first circuit,
   the second direction being the same as a direction of energization of the second coil, the energization of the second coil having been started based on the operation of the first circuit;
   a control section that controls the operation of the first circuit and an operation of the second circuit; and
   a humidity detection unit that detects humidity of intake air taken into the internal combustion engine,
   the control section being configured to control the first circuit to advance start timing of the spark discharge generated by the first circuit in accordance with an increase in the humidity of the intake air.

2. The ignition device according to claim 1, wherein the control section is configured to control the second circuit to increase an amount of energy supplied by the second circuit to the spark plug in accordance with an increase in the humidity of the intake air.

3. The ignition device according to claim 2, wherein the control section controls the operation of the second circuit to thereby extend a period of the continuation of the spark discharge carried out by the second circuit, thus increasing the amount of energy supplied to the spark plug.

4. The ignition device according to claim 2, wherein the control section controls the operation of the second circuit to thereby increase an amount of the energization to the secondary coil, thus increasing the amount of energy supplied to the spark plug.

5. The ignition device according to claim 3, wherein the control section controls the operation of the second circuit to thereby increase an amount of the energization to the secondary coil, thus increasing the amount of energy supplied to the spark plug.

* * * * *